United States Patent [19]

Daussan et al.

[11] 4,295,891

[45] Oct. 20, 1981

[54] BLANKET POWDER FOR COVERING A MOLTEN METAL BATH

[75] Inventors: Jean-Charles Daussan; Gérard Daussan, both of Metz; André Daussan, Longeville les Metz, all of France

[73] Assignee: Daussan et Compagnie, Woippy, France

[21] Appl. No.: 175,680

[22] Filed: Aug. 5, 1980

[30] Foreign Application Priority Data

May 16, 1980 [FR] France .................................. 80 10983

[51] Int. Cl.³ ............................................ C04B 35/52
[52] U.S. Cl. .......................................... 501/99; 75/96; 501/133
[58] Field of Search ....................... 106/56, 69; 75/96

[56] References Cited

U.S. PATENT DOCUMENTS 2,720,462  10/1955  Jones ..................................... 106/69

FOREIGN PATENT DOCUMENTS 697474  9/1953  United Kingdom .................. 106/69

Primary Examiner—James Poer
Attorney, Agent, or Firm—Young & Thompson

[57] ABSTRACT

A blanket powder for covering a molten metal bath in order to prevent oxidation and to provide heat insulation contains, in addition to the ash of cereal hulls, approximately 5 to 50% by weight of non-calcined cereal hulls. The powder can thus be transported and handled without any attendant danger of contaminating dust formation and has enhanced heat-insulating power.

9 Claims, No Drawings

BLANKET POWDER FOR COVERING A MOLTEN METAL BATH

This invention relates to a blanket powder for covering a bath of molten metal.

In order to prevent oxidation and to provide heat insulation of a molten metal bath such as liquid steel contained in a casting tundish or like metallic vessel, one of the known methods consists in spreading a powder of heat-insulating particles over the surface of the molten metal. There is thus formed at the surface of the molten metal a continuous powdery layer or "blanket" which ensures the desired protection and insulation.

The powder which is usually employed for this purpose is made up of inorganic compounds such as vermiculite, perlite, fossil silica, soot obtained from thermal or electric power plants, alumina, magnesia or dolomite.

In order to obtain good heat insulation, it is necessary to employ relatively large quantities of these compounds. Furthermore, these compounds suffer from a disadvantage in that they have a tendency to scorify in contact with the molten metal. The scoria thus formed produce undesirable effects on the metallurgical vessels which contain said metal and may in some instances be attended by serious consequences.

Another type of blanket powder consists of the so-called exothermic mixtures. These mixtures contain oxidizable substances and products such as alumina, magnesia, silico-aluminum and the like which give rise to an exothermic reaction in contact with the molten metal. The heat generated during this reaction prevents cooling of the surface of the molten metal bath.

However, once this exothermic reaction is completed, the heat-insulating power of powders of this type rapidly becomes insufficient. Moreover, these powders are relatively costly.

It has also been proposed to use a blanket powder consisting of ash obtained from hulls of cereals and especially rice. The advantages of a powder of this type lie in the fact that it is inexpensive and has a remarkable heat-insulating power by reason of the particular structure of rice-hull ash. In fact, this type of ash is composed of particles of silica of hemispherical shape to which adheres the residual carbon derived from the calcination of rice hulls. By virtue of this structure, rice-hull ash has a very low density, which partly explains its excellent heat-insulating power.

Moreover, the residual carbon of rice-hull ash endows this latter with refractory properties, thus preventing the hemispherical particles of silica from melting as they come into contact with the molten metal.

Rice-hull ash therefore appears a priori to have ideal characteristics for use as a blanket powder for a molten metal bath.

There is, however, one major drawback attached to the use of ash derived from rice hulls. The hemispherical particles of silica of this ash are extremely fragile, with the result that they are reduced to dust under the action of the least pressure exerted on them. Thus, at the time of transportation, handling and spreading of these ashes, a very high proportion of hemispherical particles of silica is pulverized, thus resulting in a considerable loss of heat-insulating properties.

Furthermore, when rice-hull ash is spread over the surface of a molten metal bath, this operation produces a substantial release of dust as a result of the upward convection of hot air above the molten metal. This release of dust gives rise to considerable pollution in the vicinity of the metallurgical vessel.

For these reasons, it is practically out of the question to employ rice-hull ash in the pure state as a blanket powder. Thus, rice-hull ash can be employed only in the form of a mixture with other conventional ingredients. However, this makes it altogether impossible either to utilize the theoretical advantages of this ash to the fullest extent or to avoid the above-mentioned disadvantages of these conventional ingredients.

The aim of the present invention is to produce a blanket powder for covering a molten metal bath, which comprises a cereal-hull ash and is not attended by the disadvantages mentioned earlier.

In accordance with the invention, said blanket powder is distinguished by the fact that it contains in addition 5 to 50% by weight approximately of noncalcined cereal hulls.

By virtue of this addition of non-calcined cereal hulls, the two following surprising results are obtained:

the powder can be transported and handled without incurring any risk of reduction to dust of the hemispherical particles of silica of cereal-hull ash; there are consequently no longer any emanations of contaminating dust particles;

the powder has enhanced heat-insulating power.

The range of 5 to 50% indicated above is justified on the following grounds:

below 5% by weight of non-calcined cereal hulls, the results given in the foregoing are not significant;

above 50% by weight of non-calcined cereal hulls, combustion of these hulls produces excessively large flames and this is unacceptable, especially from a safety standpoint.

In one advantageous embodiment of the invention, the blanket powder is constituted by a homogeneous mixture of rice-hull ash and non-calcined rice hulls, the proportion of rice-hull ash being preferably within the range of 70 to 80% by weight and the proportion of noncalcined rice hulls being within the range of 30 to 20% by weight.

The best results are in fact obtained by means of the mixture of powders and the proportions which have just been given.

These and other features of the invention will be more apparent to those versed in the art upon consideration of the following description.

The blanket powder in accordance with the invention is obtained from a mixture which is as intimate as possible and consists of cereal-hull ash and 5 to 50% by weight of non-calcined cereal hulls.

A few examples of a blanket powder in accordance with the invention in which rice hulls are employed will now be given below.

EXAMPLE 1

Rich-hull ash: 95% by weight
Non-calcined rice hulls: 5% by weight

EXAMPLE 2

Rice-hull ash: 50%
Non-calcined rice hulls: 50%

EXAMPLE 3

Rice-hull ash: 75%
Non-calcined rice hulls: 25%

Experience has shown that the blanket powder in accordance with Example 3 produces the best results.

Surprisingly, it has been found that a blanket powder formed in this manner could be handled and transported without any special precautions and without forming contaminating dust particles.

This surprising result is explained by the fact that the silica hemispheres of the ash are protected from each other by the non-calcined rice hulls which thus perform the function of a protective wrapping or cushion. Thus the silica hemispheres remain intact, even when the powder is subjected to relatively high mechanical stresses, for example within a mixer or within a feed auger or when the powder is being conveyed by pulsed air.

The absence of dust formation is also explained by the fact that the non-calcined rice hulls which are located between the hemispherical particles of silica produce an appreciable reduction in the friction which is developed between these latter when the powder is being handled. This reduction in friction also permits better spreading of the powder over the metal bath.

The heat-insulating power provided by the silica hemispheres of the rice-hull ash thus remains intact.

Moreover, when the blanket powder in accordance with the invention is brought into contact with the liquid metal, the non-calcined rice hulls ignite and are converted within the powder to hemispherical particles of silica charged with residual carbon, these particles being similar to the silica particles constituting the rice-hull ash employed at the outset. The hemispherical particles thus formed "in situ" have the ideal "nascent" dimensions and shape which endow the ash with optimum heat-insulating power.

The hemispherical particles which are formed "in situ" as mentioned above are in fact not liable to undergo any degradation since they are not subjected to any stress within the powder which is spread over the liquid metal. Moreover, said particles support the other powder particles and prevent packing of the powder which would cause a reduction of its heat-insulating power.

The outstanding heat-insulating power of the powder in accordance with the invention is thus due on the one hand to its highly aerated structure which results from the hemispherical shape of the particles and on the other hand to the fact that these latter have a silica base. A further explanation of this remarkable heat-insulating power lies in the excellent reflecting power of the hemispherical particles of silica which produce a veritable greenhouse effect.

Combustion of the rice hulls within the powder as this latter comes into contact with the liquid metal bath is not particularly rapid by reason of the fact that the hulls are practically out of contact with the surrounding air since they are surrounded by incombustible and refractory material.

It should be added that this relatively slow combustion proves advantageous since it has the effect of generating heat, thus tending to limit cooling of the surface of the liquid metal bath.

At first sight, there was some reason to believe that the effect of this combustion would be to raise the temperature of the powder to a level such that the hemispherical particles of silica finally melt and fuse together in a sintering process and/or form scoria. However, this result has not been observed in practice. This can be explained by the fact that the residual carbon which adheres to the hemispherical particles of silica endows these latter with heat-resistant properties.

As long as the proportion of non-calcined rice hulls does not exceed 50% by weight, the flames produced by the combustion of these hulls do not reach a prohibitive height. Thus the extreme case of Example No. 2 given above remains acceptable.

Example No. 1 justifies the bottom limit of the proportion of non-calcined rice hulls. Below this limit, the properties of the corresponding powder are scarcely superior to those of a powder consisting of the ash of pure rice hulls.

The best results are thus obtained when the powder contains 70 to 80% by weight of rice-hull ash and 30 to 20% by weight of non-calcined rice hulls.

Excellent results can also be obtained by replacing the rice hull by hulls or husks of other cereals such as wheat, oats, barley, rye and even corn.

Interesting examples of a blanket powder containing husks of wheat or corn are given hereunder.

EXAMPLE 4

Wheat-husk ash: 70% by weight
Wheat husks: 30% by weight.

EXAMPLE 5

Corn-husk ash: 70% by weight
Corn husks: 30% by weight.

Conventional mineral charges can also be added to the mixture of non-calcined cereal hulls and of cereal-hull ash as indicated in the example given below.

EXAMPLE 6

Rice-hull ash: 45% by weight
Non-calcined rice hulls: 15% by weight.
Powdered mineral charge (perlite and/or expanded or non-expanded vermiculite or fossil silica and/or steatite, chalk or talc): 40% by weight.

The proportions indicated in the above example can be modified within the following ranges:
Rice-hull ash: 45 to 60%
Non-calcined rice hulls: 15 to 25%
Mineral charge: 15 to 40% by weight.

The above-mentioned mineral charges can be replaced by expandable graphite as indicated in the example given below.

EXAMPLE 7

Rice-hull ash: 72%
Non-calcined rice hulls: 25%
Expandable graphite: 3%.

The proportions indicated in this example can be modified within the following ranges:
Rice-hull ash: 55 to 75% by weight
Non-calcined rice hulls: 30 to 20% by weight
Expandable graphite: 5 to 15% by weight.

The blanket powder in accordance with the invention can also contain a chemical compound which is capable of liberating an incombustible gas under the action of the heat generated by the molten metal bath. Among these compounds can be mentioned in particular the metallic carbonates which liberate carbon dioxide gas, thus limiting flame formation within the powder. It is also possible to employ ammonium compounds and/or aminated compounds which liberate nitrogen and/or ammonia. Such compounds have the effect not only of limiting flame formation but also of limiting oxidation of the molten metal by atmospheric oxygen.

To this end, the following example is accordingly given:

EXAMPLE 8

Rice-hull ash: 60%
Non-calcined rice hulls: 25%
Compound for generating incombustible gas: 15%.

In order to prevent flame formation, especially when employing large proportions of non-calcined hulls of rice or cereals as in the case of Example 1, it is an advantage to add to the powder a nonflammable product such as derivatives of bromine, phosphoric esters or simply a mixture of methanol and a sodium hydroxide solution.

Furthermore, in order to ensure that dust formation is completely prevented when spreading the powder in accordance with the invention, it is an advantage to add to this latter a mineral oil such as engine sump drainage oil in accordance with the following example:

EXAMPLE 9

Rice-hull ash: 50 to 70%
Non-calcined rice hulls: 10 to 30%
Sump drainage oil: 10 to 20%.

It will readily be understood that the invention is not limited to the examples hereinabove described and that any number of modifications may accordingly be contemplated without thereby departing either from the scope or the spirit of the invention.

It accordingly follows that, when employing a small proportion of cereal hulls, the powder can also contain particles of combustible carbonaceous substances such as fine sawdust and/or vegetable particles.

Moreover, at least part of the blanket powder in accordance with the invention can contain cereal-hull ash and non-calcined hulls in the form of granules obtained by means of a binding agent such as paper pulp, dextrin or sugar. This presentation of the blanket powder is advantageous for pneumatic transportation of this latter.

What is claimed is:

1. A blanket powder for covering a molten metal bath, comprising a cereal-hull ash, wherein said powder further contains approximately 5 to 50% by weight of non-calcined cereal hulls.

2. A blanket powder according to claim 1, wherein said powder is constituted by a homogeneous mixture of rice-hull ash and of non-calcined rice hulls.

3. A blanket powder according to claim 2, wherein said powder contains 70 to 80% by weight of rice-hull ash and 30 to 20% by weight of non-calcined rice hulls.

4. A blanket powder according to claim 1, wherein said powder contains 45 to 60% by weight of rice-hull ash, 15 to 25% by weight of non-calcined rice hulls and 15 to 45% of powdered mineral charges chosen from the following compounds and their mixtures: perlite, expanded or nonexpanded vermiculite, fossil silica, steatite, chalk and talc.

5. A blanket powder according to claim 1, wherein said powder contains 55 to 75% by weight of rice-hull ash, 30 to 20% by weight of non-calcined rice hulls, and 5 to 15% by weight of expandable graphite.

6. A blanket powder according to claim 1, wherein said powder further contains a chemical compound which is capable of liberating an incombustible gas such as nitrogen or ammonia.

7. A blanket powder according to claim 1, wherein said powder contains approximately 50 to 70% by weight of rice-hull ash, 10 to 30% by weight of non-calcined rice hulls and 10 to 20% by weight of mineral oil.

8. A blanket powder according to claim 1, wherein said powder further contains a nonflammable compound.

9. A blanket powder according to claim 1, wherein at least part of said powder is in the form of granules.

* * * * *